H. C. McKINLEY.
BORING AND CUTTING TOOL.
APPLICATION FILED SEPT. 25, 1916.
1,298,071.
Patented Mar. 25, 1919.
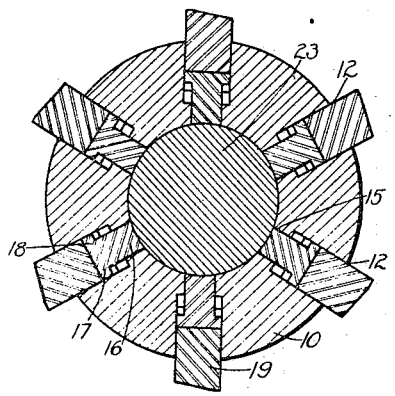
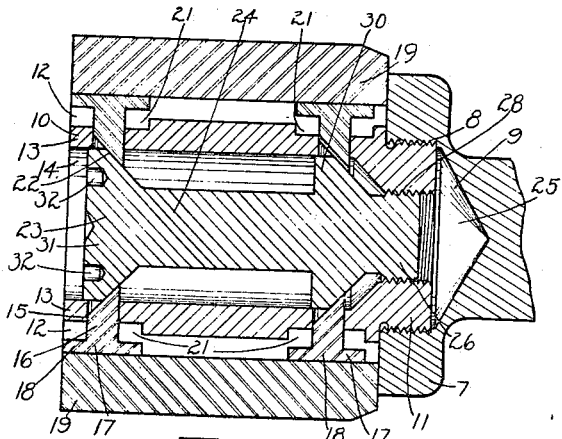
Inventor
Harry C. McKinley
By J. O. Richey
His Atty

UNITED STATES PATENT OFFICE.

HARRY C. McKINLEY, OF ELYRIA, OHIO, ASSIGNOR OF ONE-HALF TO CHARLES MARSH, OF ELYRIA, OHIO.

BORING AND CUTTING TOOL.

1,298,071.     Specification of Letters Patent.     Patented Mar. 25, 1919.

Application filed September 25, 1916. Serial No. 121,942.

*To all whom it may concern:*

Be it known that I, HARRY C. McKINLEY, a citizen of the United States, and a resident of Elyria, county of Lorain, and State of Ohio, have invented certain new and useful Improvements in Boring and Cutting Tools; and I do hereby declare the following to be a full, clear, and exact description of the invention, such as will enable others skilled in the art to which it appertains to make and use the same.

This invention relates to boring and cutting tools such as reamers and taps, and more particularly to improvements in reamers and taps which employ removable blades. I aim to provide a device which employs successfully blades or cutters which can be more easily and more cheaply manufactured than those employed heretofore. I also provide a device in which the same type of blade may be employed in reamers of various sizes. By the use of my invention a stronger and stancher tool may be made which will achieve in addition the objects I have mentioned.

I aim to accomplish the above objects and at the same time produce a blade or cutter which can be invariably rigidly and firmly connected in the tool, and in which the blades may all extend at the same distance from the edge of the tool, so that each will participate in the boring or cutting action.

By my invention I provide means for firmly and rigidly connecting the blades in the tool, so they will not shift or tilt in operation, maintaining the outer edges of the blades truly parallel to each other, and in which rattling or chattering in the sockets will be prevented.

These and other objects of my invention will be apparent and the invention better understood from a description of an embodiment of my invention.

Figure 1 is a longitudinal section through a reamer showing an embodiment of my invention.

Fig. 2 is a section through the embodiment shown in Fig. 1 at right angles to the view of Fig. 1.

Fig. 3 is a half longitudinal section, half elevation of a reamer smaller in bore than that of Fig. 1.

Fig. 4 is a section taken through Fig. 3 at right angles to the view of Fig. 3.

Figs. 5 and 6 are perspective views of elements of the reamers shown in Figs. 1 to 4 inclusive.

Referring now to the embodiment of the invention illustrated in the drawing, at 7 is shown the reamer stem or support through which the reamer is rotated. The part 7 is, in the embodiment shown, provided with a cylindrically threaded bore 8 and a conical recess 9 in the bottom thereof, for a purpose to be described. The body of the reamer is shown at 10 provided with an exteriorly threaded cylindrical lug 11 which screws into the threads in the bore 8 in the stem 7. The head is provided with a plurality of longitudinal, angularly spaced blade slots 12 which extend radially from the periphery toward the center of the head, leaving webs 13 between the bottom of the slots and a bore 14, here shown as axially extending, in the center of the body of the reamer. Radial openings 15 are cut through the webs, placing the slots and the bore in communication. In the form shown two such openings are cut between each slot and the bore, one near each end. Through these openings there extend the stems 16 of devices which I will here call blade supports or pushers 17. The pushers are provided with heads 18 which, when the parts are assembled, rest against the blades 19.

Any suitable number of pushers may be employed. I have here shown two per blade, furnishing supporting bearings for each end of the blade and preventing any tilting or shifting thereof. If more or less support is needed, the number of the pushers may be varied accordingly. The heads 18 of the pushers also act as a bearing for the bottom of the blades and are preferably made of the same width or substantially the same width as the slots, as best shown in Fig. 3, so as to facilitate the preventing of their turning or otherwise changing their positions in the slots. The bottoms of the slots may be provided with recesses 21, best shown in Fig. 1, in which the heads of the pushers rest when the blades are in way-down position, as illustrated in Fig. 3.

The ends of the stems 16 are beveled off, as shown at 22, to form cam surfaces to cooperate with an adjusting member 23. The adjusting member consists of a main portion 24, provided with an exteriorly threaded neck 26 which threads into an interiorly threaded bore 28 in the body portion of the reamer. The adjusting tool is provided with cam surfaces 50 and 51 to coöperate with the bevels 22 on the pushers. In the embodiment shown these cam surfaces are formed by two conical or frusto-conical shoulders 30 and 31 so positioned as to engage the beveled surfaces 22 upon the devices 17. The exterior diameter of the parts 30 and 31 should be the same or substantially the same as the bore 14 in the body portion of the reamer, as best illustrated in Fig. 2. This arrangement secures the best results, as the adjustment will be more accurate.

Suitable means are provided through which the adjusting member 24 is rotated, here shown as openings 32 for some tool such as a spanner wrench. As will be seen the blades employed are provided with a straight back 40 which engages the upper surfaces 41 of the pusher heads 18.

The means provided in the embodiment shown for securing the blades in the body of the reamer will now be described. To one side of each of the slots an opening 42 is formed in the body of the reamer and from this opening a bore 43 is driven farther into the body of the reamer and is threaded. Securing means for the blades, such as screws 44, are driven into these bores, the heads 45 of these screws engaging shoulders 46 on the blades. In the embodiment shown, these shoulders are formed by cutting an opening 47 in a side of the blade, and part way through the same.

As will be seen, the blades may be made straight-backed, thereby making it much more convenient and cheaper to make and repair the blades. On this account the blades will also be more durable and there will not be any angular parts which are frequently broken or strained so as to make the blade useless. It is easier to secure accurate adjustment and alinement of the blades with my invention, since it is comparatively an easier matter to make a straight back blade with a smooth surface and to secure uniformity of output, since the back of each blade will be exactly like the backs of all other blades.

It will also be seen that the same size blade may be used upon reamers of any diameter, since the slots may also be made of the same depth, the difference in diameter being taken care of by the length of the stem 16 of the devices 17. The reamer will be stronger, since instead of cutting the slots clear through, the web 13 is left and the larger the reamer the thicker will be the web and the stronger the tool, which will be advantageous in view of the fact that the larger tools are as a rule required to do heavier work. When once adjusted, the blades can be so securely fastened between the screws 43 and the pushers that it will be impossible for them to chatter or rattle, or in any way change their positions.

In assembling the apparatus shown in the drawing, the adjusting member 24 is first secured in the body of the reamer in any suitable way. The devices 17 are placed in the openings, their beveled surfaces 22 engaging the cam surfaces of the adjusting member. The blades are placed in the slots with their flat back surfaces 40 resting against the heads 18 of the devices 17. The screws 43 may then be placed in position and part way driven into the bores provided for them. The blades are then adjusted to the desired position by rotating the adjusting member 24, which moves axially in the bore 14 and through the cam action of its cam surfaces and the beveled surfaces 22, forces the devices 17 radially until the blades are in the desired position. The screws 43 are then driven down, firmly locking the blades in position. The tool is then ready to be used. When thus assembled, the devices 17 act radially outward on the blades and the screws 43 act in the opposite direction.

I have shown this embodiment of my invention in order to better explain the same. I do not wish to be limited to this embodiment or to the details thereof, as many departures may be made from the form and details of such embodiment without departing from the spirit of the invention.

I claim:—

1. In a tool of the character described, a body member having a central bore and a threaded opening, an adjusting member having a threaded extension fitting in said opening, frusto-conical flanges on said member and located adjacent each end thereof, said body member having a plurality of peripherally spaced slots extending inwardly and being separated from said bore by web members, said web members having a plurality of holes extending into said bore, blade supports in said holes having cam members bearing on said flanges, cutting blades adapted to fit in said slots and to bear against said supports, and means for rigidly holding the blades against the supports.

2. In a tool of the character described, a body member having a central bore and a threaded opening, an adjusting member having a threaded extension fitting in said opening, frusto-conical flanges adjacent each end of said adjusting member, said body member having a plurality of peripherally spaced slots extending longitudinally thereof, said slots also extending radially toward said bore and being separated therefrom by web members, said web members having a plurality of holes extending into the bore, T-shaped supports having heads adapted to fit in said slots and cam stems adapted to bear against said flanges, cutting blades adapted to fit in said slots and means bearing against said shoulders for forcing the blades against the heads on said supports.

3. In a tool of the character described, a body member having a central bore and a threaded opening of less diameter than said bore, an adjusting member having a threaded extension fitting in said opening, frusto-conical flanges adjacent each end of said adjusting member, said body member having a plurality of peripherally spaced slots extending longitudinally thereof and radially toward said bore, and being separated therefrom by web members, said web members having a plurality of recesses and radial holes extending into said bore, T-shaped supports having heads adapted to fit in said recesses and cam stems adapted to bear against said flanges, cutting blades with shoulders near their base adapted to fit in said slots and bear against said shoulders, and means for forcing the blades against the heads on said supports.

4. In a tool of the character described, a body member having a longitudinal bore with threads therein, an adjusting member in said bore having threads coöperating with the first-mentioned threads, conical-shaped cams on said member located adjacent each end thereof, said body member having a plurality of peripherally spaced slots extending inwardly and being separated from said bore by web members, said web members having a plurality of holes extending into the bore, blade supports in said holes having a portion bearing on said cams, cutting blades adapted to fit in said slots and to bear against said supports whereby said blades are adjusted radially outward when said adjusting member is threaded into the longitudinal bore, and means for radially locking the blades against said supports for all adjustments thereof.

5. In a tool of the character described, a body portion having a longitudinal bore with threads therein, an adjusting member in said bore having threads coöperating with the first-mentioned threads, a conical-shaped cam on said member, said body member having a plurality of peripherally spaced slots extending inwardly and being separated from said bore by web members, said web members having a plurality of holes extending into the bore, blade supports in said holes having a portion bearing on said cam, cutting blades adapted to fit in said slots and to bear against said supports, whereby said blades are adjusted radially outward when said adjusting member is adjusted into said longitudinal bore, and means for radially locking the blades against said supports for all adjustments thereof.

In witness whereof, I have signed my name hereunto this 21st day of September, 1916.

HARRY C. McKINLEY.